United States Patent [19]

Marmarelis et al.

[11] Patent Number: 5,790,475
[45] Date of Patent: Aug. 4, 1998

[54] PROCESS AND APPARATUS FOR IMPROVED INTERFERENCE SUPPRESSION IN ECHO-LOCATION AND IMAGING SYSTEMS

[75] Inventors: Vasilis Z. Marmarelis, Irvine; Chrysostomos L. Nikias, Rancho Palos Verdes, both of Calif.; David Sheby, Cherry Hill, N.J.

[73] Assignee: Multispec Corporation, Huntington Beach, Calif.

[21] Appl. No.: 738,874

[22] Filed: Oct. 28, 1996

[51] Int. Cl.$^6$ .................................................. G01S 15/00
[52] U.S. Cl. ........................ 367/100; 367/7; 342/179
[58] Field of Search ................................ 367/100, 901, 367/88, 7, 179; 342/16, 145, 134, 189, 194, 196, 25, 203

[56] References Cited

U.S. PATENT DOCUMENTS 4,639,548 1/1987 Oshima et al. .................... 371/46
4,837,766 6/1989 Yoshida .............................. 371/46
5,175,558 12/1992 Dupree ............................. 342/378

Primary Examiner—Daniel T. Pihulic
Attorney, Agent, or Firm—Price, Gess & Ubell

[57] ABSTRACT

In echo-location and imaging systems, interference suppression is accomplished by shaping the transmitted signal waveform. Interference suppression permits more accurate range estimates or image formation, respectively. These specially shaped waveforms can also be used in communication systems to secure more accurate message transmission in the presence of interference. Shaping of the transmitted signal may be accomplished in two ways: (1) by convolving an elemental waveform with a multi-level pseudorandom sequence (i.e., binary, ternary, Poisson, etc.); or (2) by transforming nonlinearly the amplitude of the elemental waveform to give it high skewness. Interference suppression in the former case is achieved through matched filtering (replica correlation or pulse compression), and in the latter case it is accomplished by bispectrum-bicoherence processing.

58 Claims, 10 Drawing Sheets

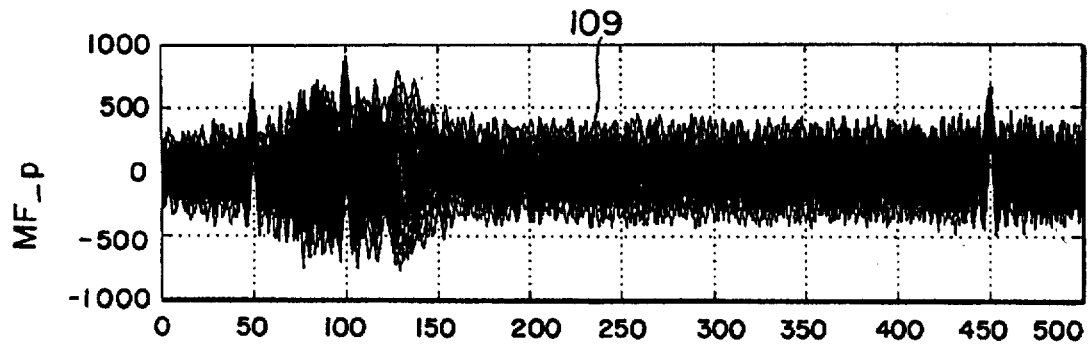
FIG. 24
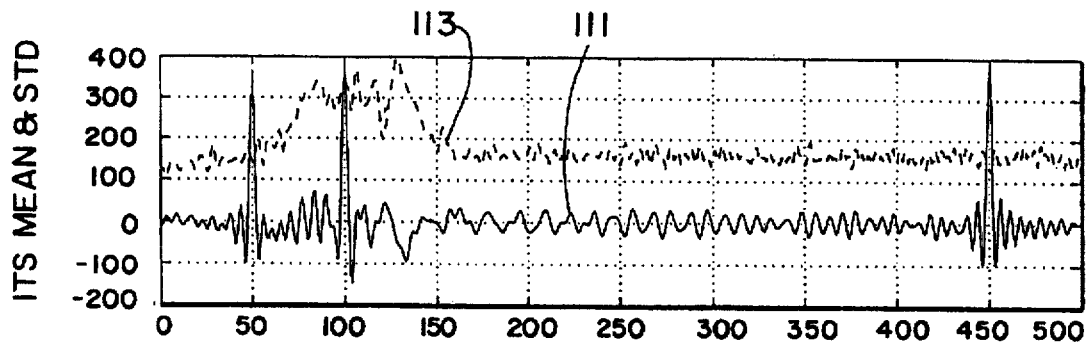
FIG. 25
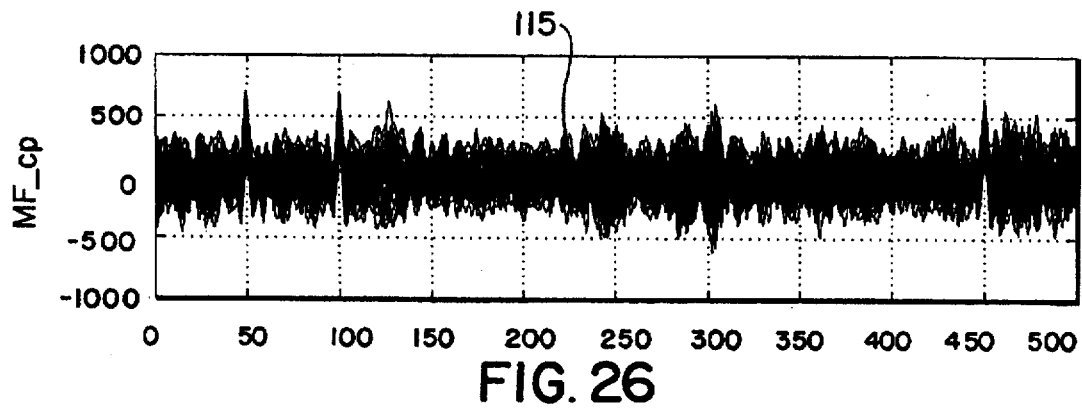
FIG. 26
FIG. 27
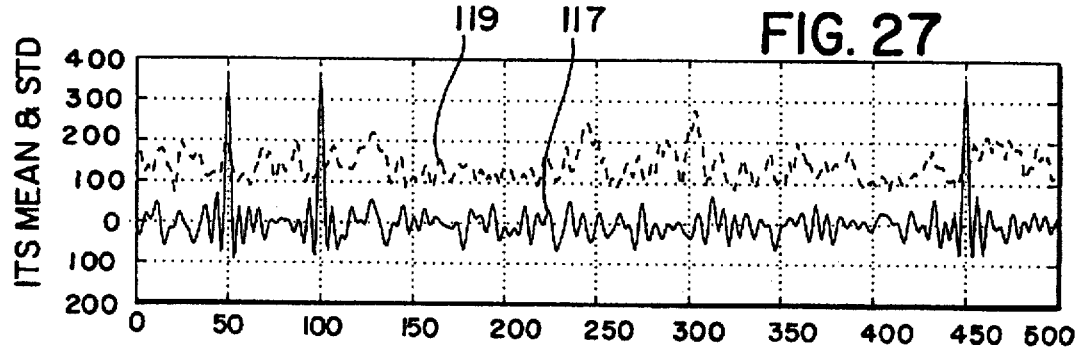

5,790,475

1

PROCESS AND APPARATUS FOR IMPROVED INTERFERENCE SUPPRESSION IN ECHO-LOCATION AND IMAGING SYSTEMS

BACKGROUND OF THE INVENTION

1. Field of the Invention

The present invention relates to a method and apparatus for enhanced signal recovery in the presence of interference and noise and, more specifically, pertains to echo-location and imaging systems wherein the improved method and apparatus provides more accurate range estimates of object locations and enhances the ability to detect reflecting objects of interest in the presence of interference and noise.

2. Description of Related Art

Suppression of interference or noise in echo-location and imaging systems has been a critical operational requirement addressed by a variety of processing techniques that seek to extricate the signal-of-interest from the data received. While such systems have been workable, improvement in efficient and reliable signal recovery in severe interference and noise is still the goal.

The performance of existing systems for the processing of the signal at the receiver end is often compromised by the presence of severe interference and noise. The present invention seeks a robust approach for enhancement of signal recovery in echo-location and imaging systems by providing for improved interference suppression and signal-to-noise ratio enhancement.

SUMMARY OF THE INVENTION

These ends are achieved by the design/shaping of transmitted waveforms, s(n), and the processing of the received data, r(n), to obtain greater suppression of interference and noise. The designed waveforms are of two general types generated by: (1) convolution of a pseudorandom sequence (binary, ternary, Poisson, etc.) with a fixed elemental waveform, such as a commonly-used chirp or sine-wave pulse; and (2) nonlinear non-odd transformation of an elemental waveform (such as a chirp signal) that yields a highly skewed waveform. Improved interference suppression is achieved by matched filtering (replica correlation) in the former case of pseudorandomly convoluted waveforms (PCW) or by bispectrum-bicoherence processing in the latter case of highly skewed waveforms (HSW). These two types of waveform design and their associated processing methodologies can also be combined for additional benefit.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

2

Figure 1:
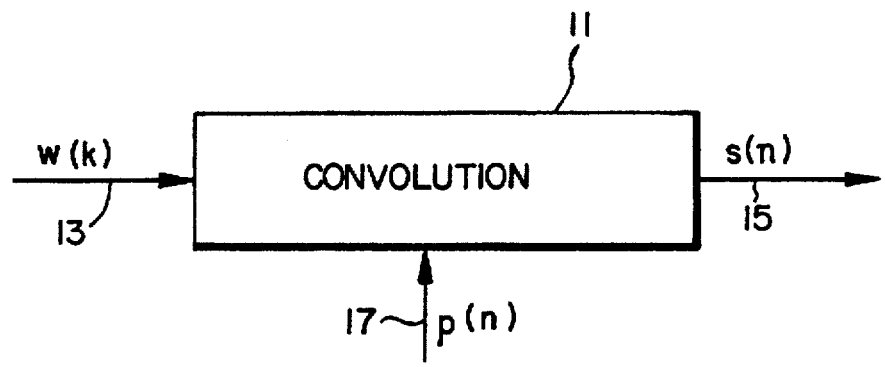
FIG. 1 is a block diagram illustration of a signal generating system for the pseudorandomly convoluted waveform (PCW) s(n), employing an elemental waveform w(k) and a pseudorandom sequence p(n)
Figure 3:
FIG. 3 is a block diagram illustration of a signal shaping system for the highly skewed waveform (HSW), employing an elemental waveform w(k) and a nonodd nonlinear transformation.
Figure 4:
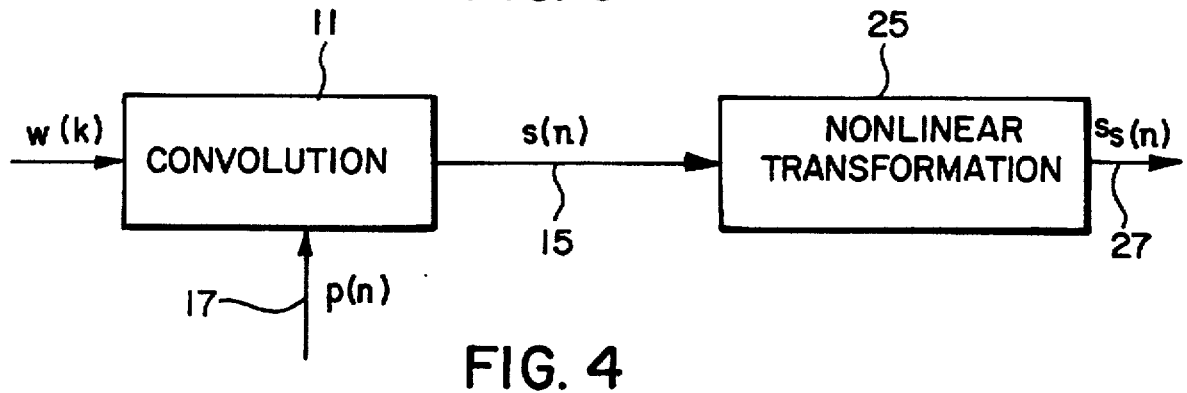
Figure 5:
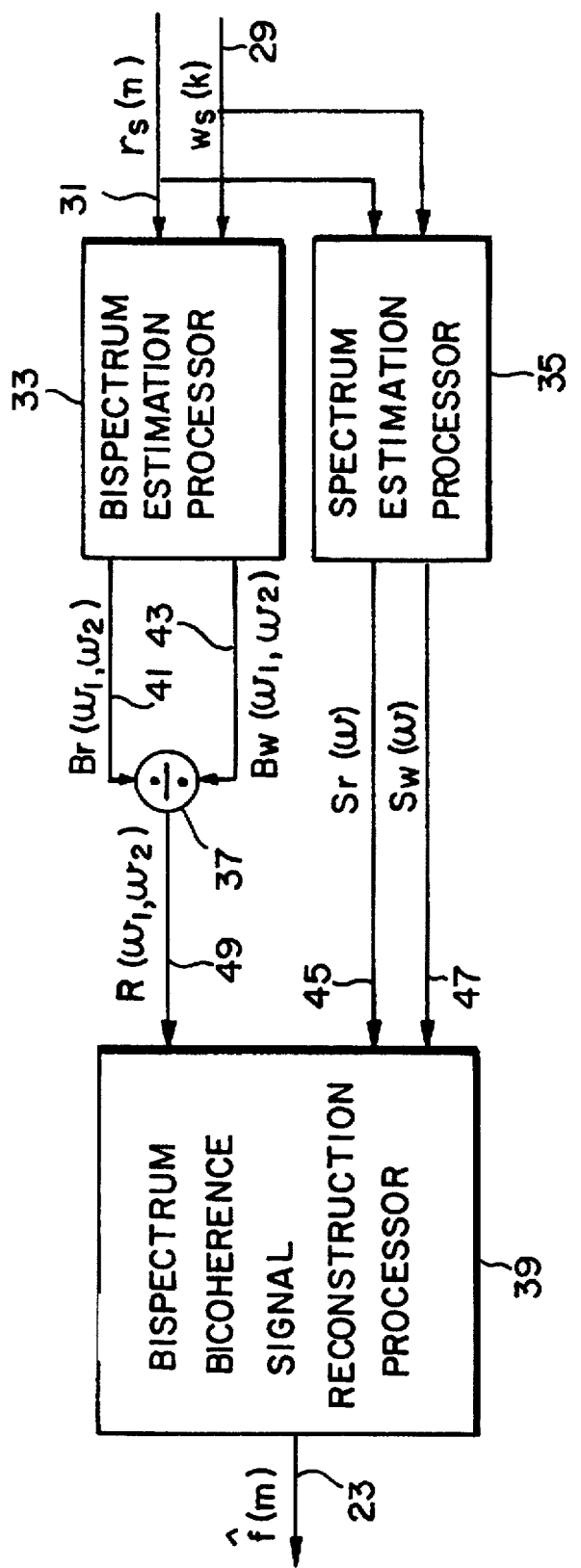
Figure 6:
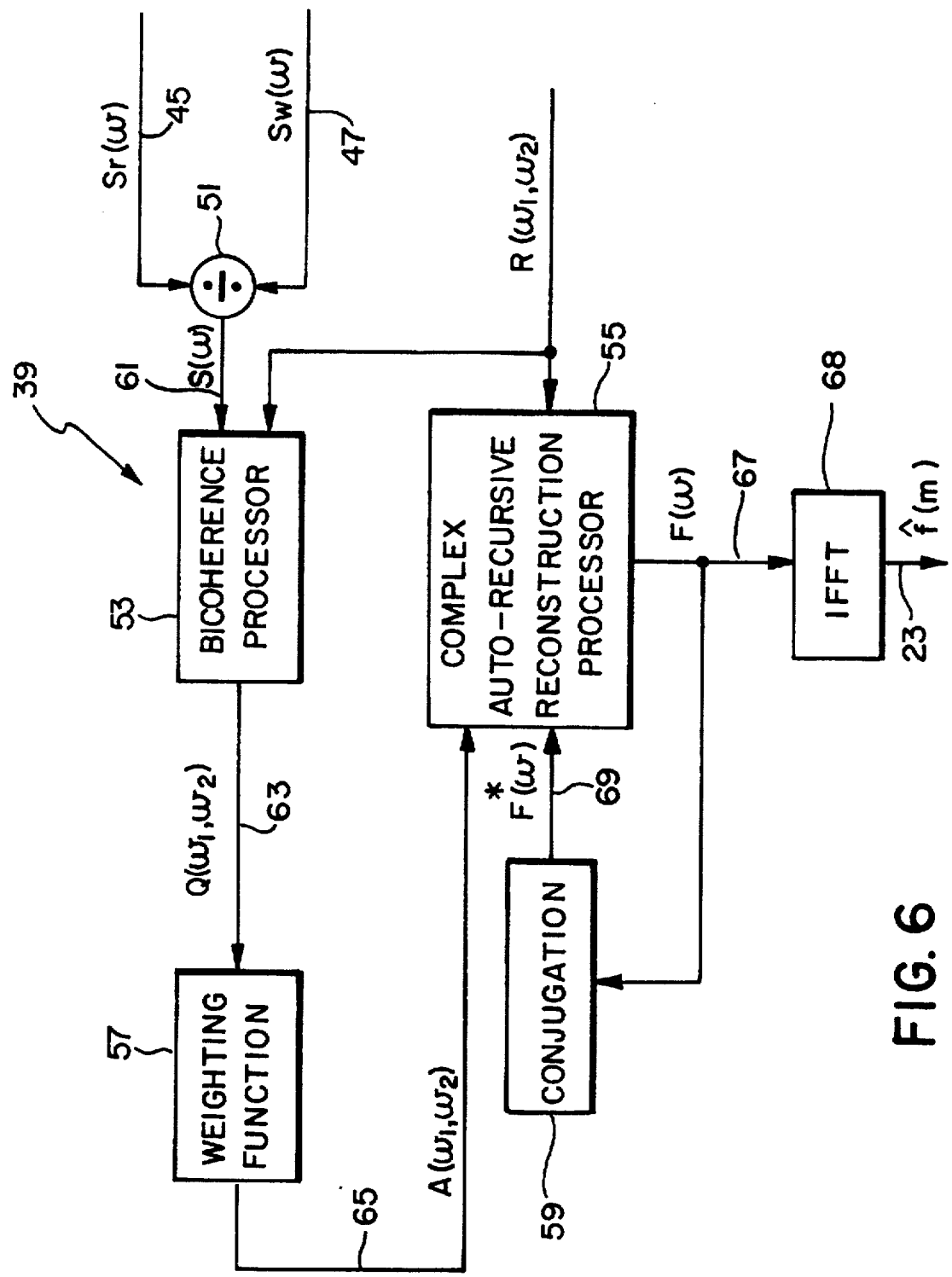
Figure 8:
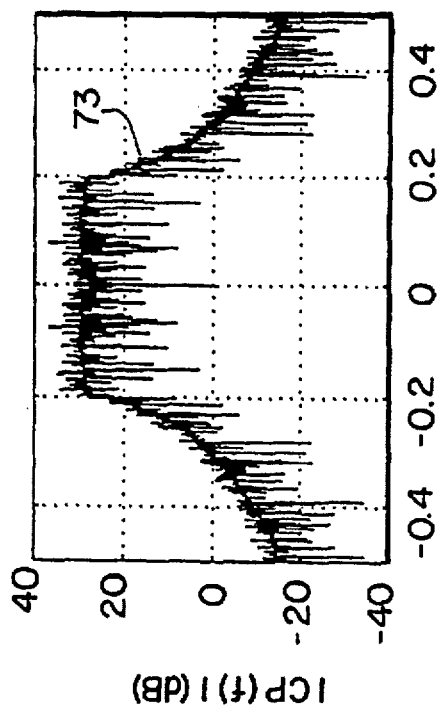
Figure 10:
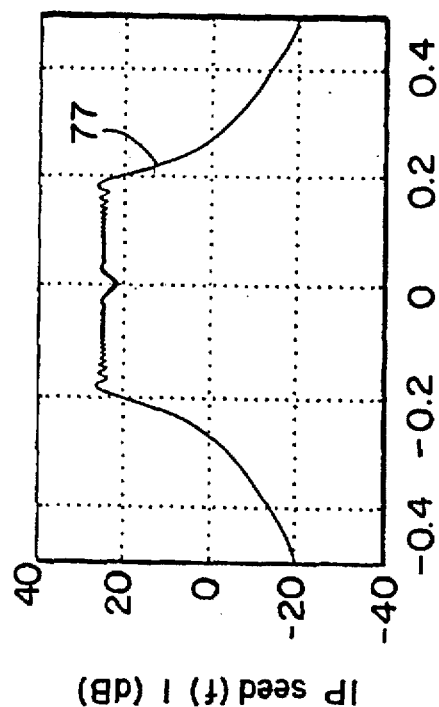
Figure 7:
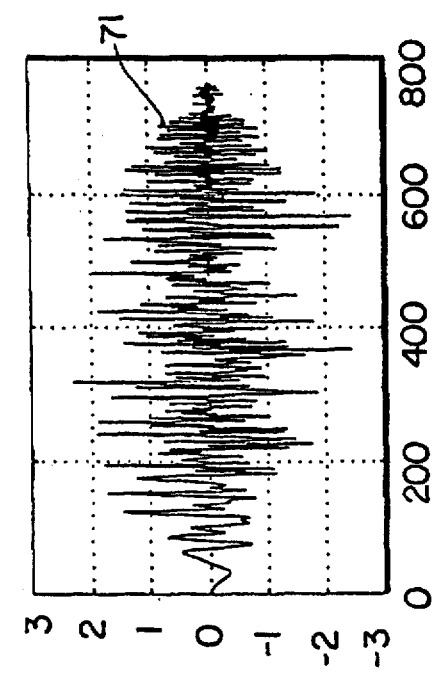
Figure 9:
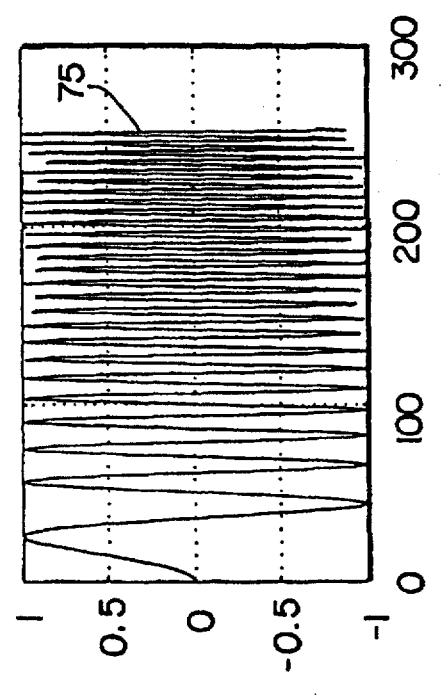
Figure 11:
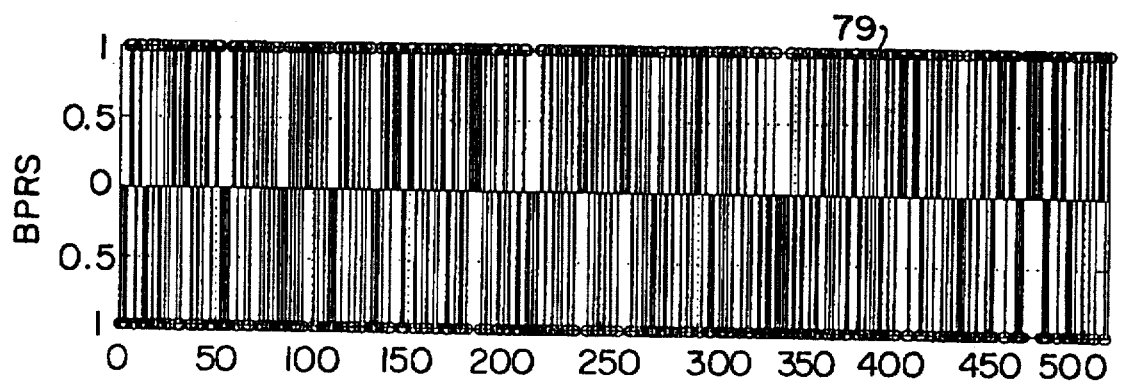
Figure 12:
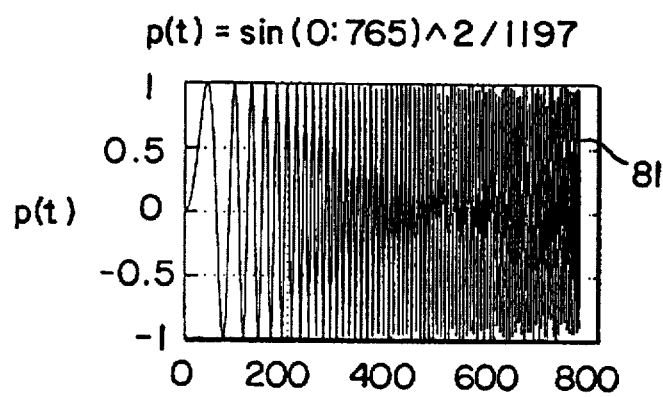
Figure 13:
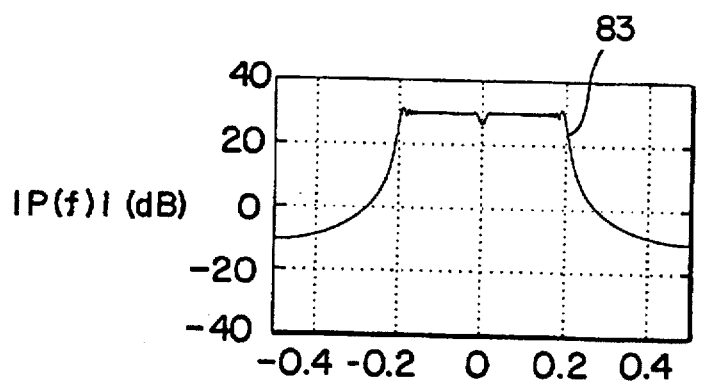
Figure 14:
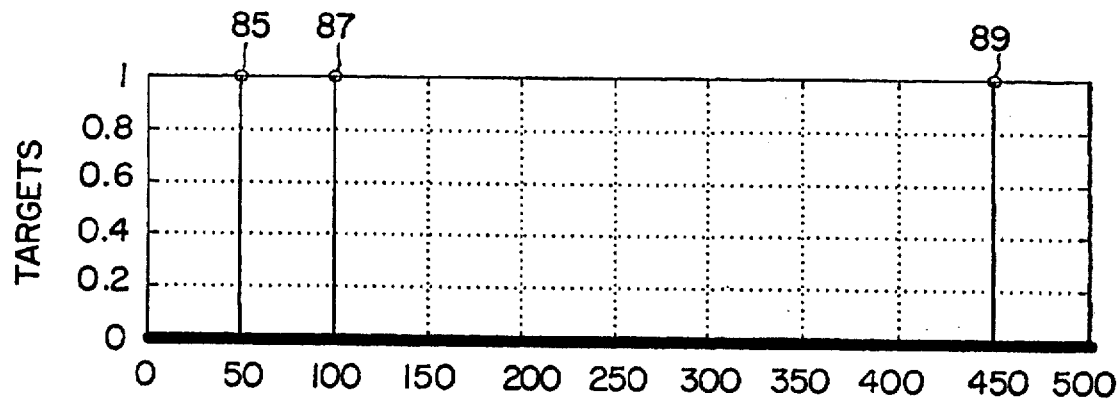
Figure 15:
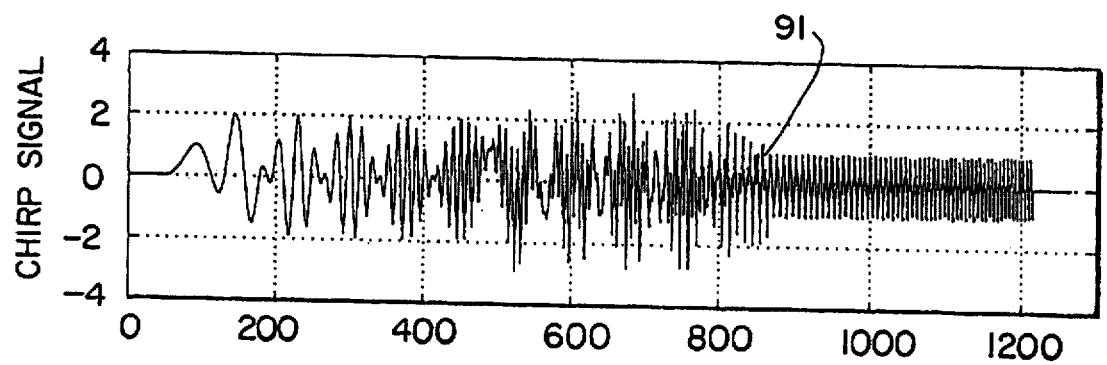
Figure 16:
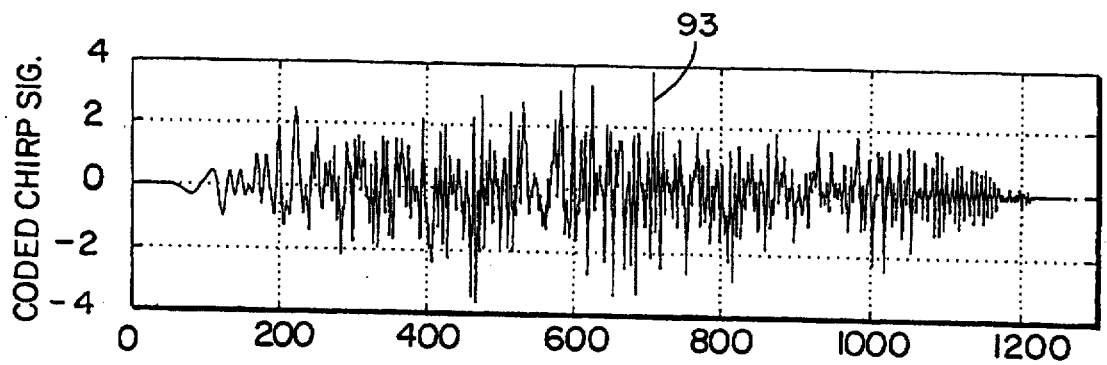
Figure 17:
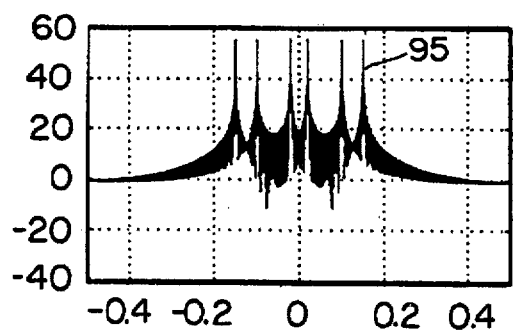
Figure 18:
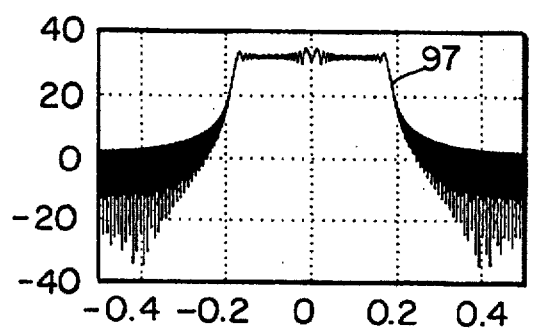
Figure 19:
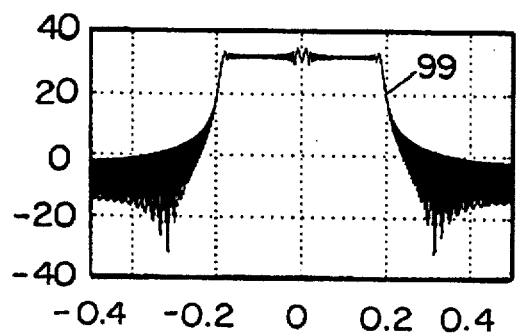
Figure 20:
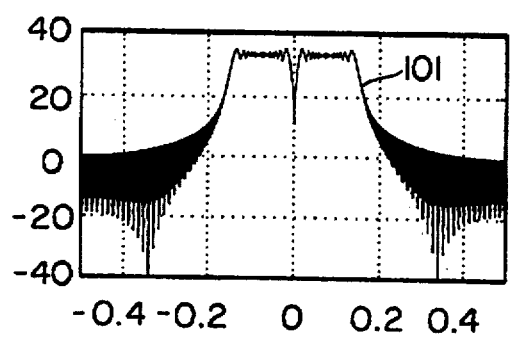
Figure 21:
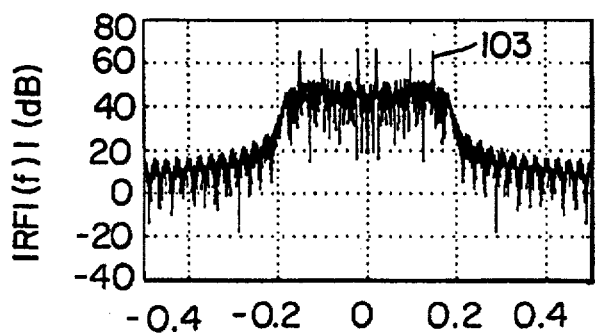
Figure 22:
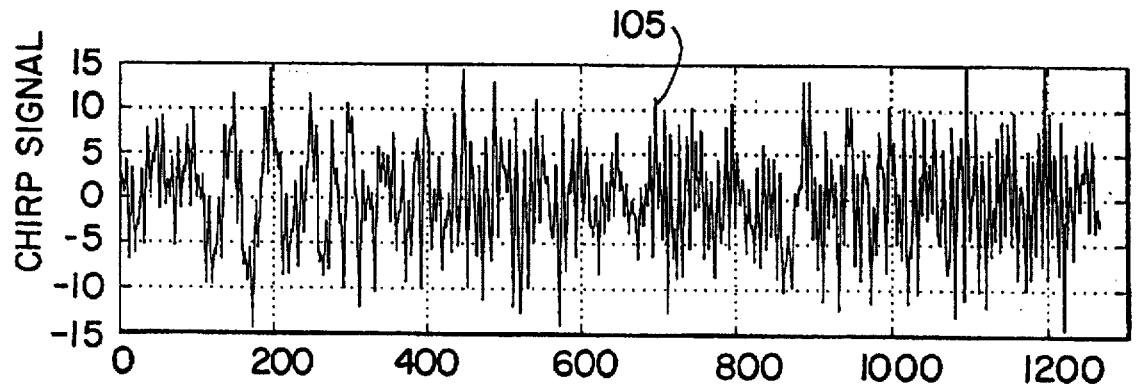
Figure 23:
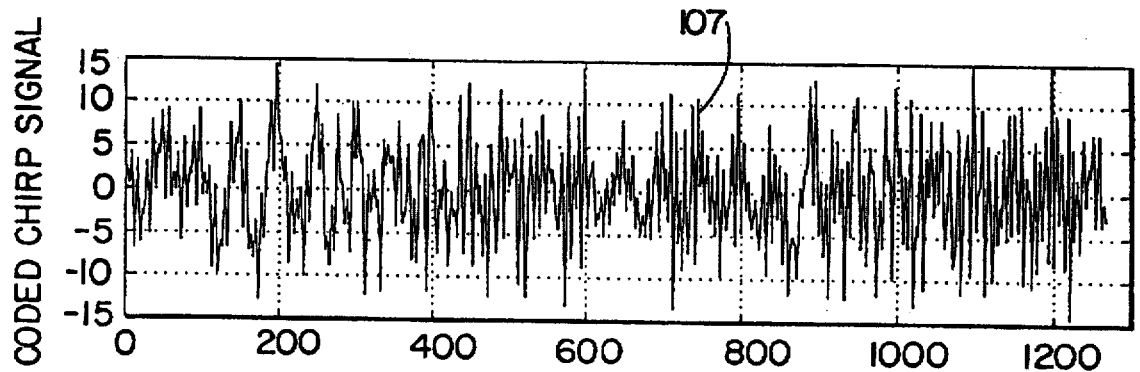
Figure 28:
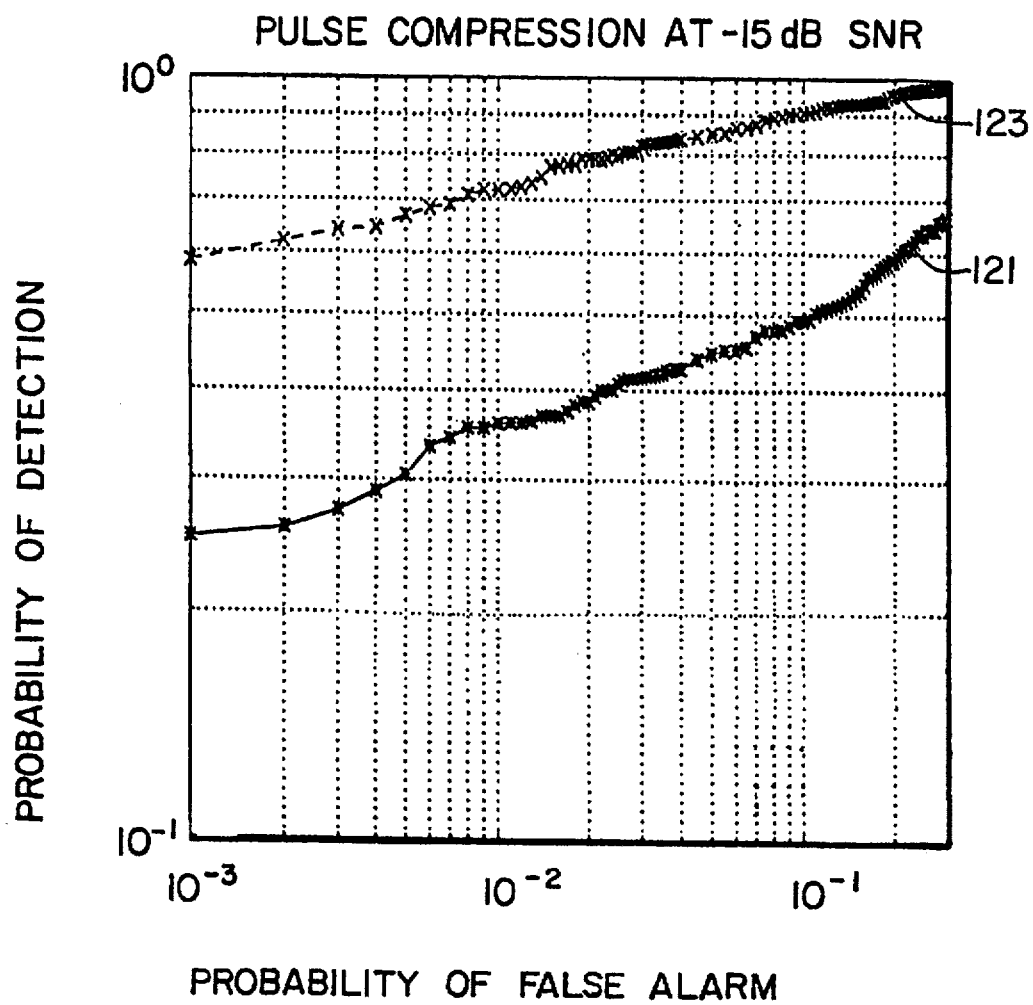

FIG. 4 is a block diagram illustration of the signal generating system for an elemental waveform w(k) which combines the shaping operations of FIGS. 1 and 3;

FIG. 5 is a block diagram illustration of the processing system utilized to recover a HSW received signal;

FIG. 6 is a block diagram illustrating the operation of the bispectrum-bicoherence signal reconstruction processor of FIG. 5;

FIG. 7 is a time domain illustration of a PCW signal;

FIG. 8 is a frequency domain illustration of the signal of FIG. 7;

FIG. 9 is a time domain illustration of the elemental waveform w(k) used to generate the PCW signal of FIG. 7;

FIG. 10 is the frequency domain illustration of the signal of FIG. 9;

FIG. 11 is an illustration of the binary pseudorandom sequence of length 511 used in generating the PCW signal of FIG. 7;

FIG. 12 is a time domain representation of a chirp signal having the same bandwidth as the signal of FIG. 7;

FIG. 13 is the frequency domain illustration of the signal of FIG. 12;

FIG. 14 is an illustration of three point targets;

FIG. 15 is a time domain representation of the echo signal received from the three point targets of FIG. 14 when the chirp signal of FIG. 12 is transmitted;

FIG. 16 is a time domain representation of the echo signal received from the three point targets of FIG. 4 when the PCW signal of FIG. 7 is transmitted;

FIG. 17 is a frequency domain illustration of three sine waves that are assumed to be part of the interference;

FIG. 18 is a frequency domain illustration of a first chirp signal assumed to be part of the interference;

FIG. 19 is a frequency domain illustration of a second chirp signal assumed to be part of the interference;

FIG. 20 is a frequency domain illustration of a third chirp signal assumed to be part of the interference;

FIG. 21 is a frequency domain illustration of the composite interference signal resulting when the signals of FIGS. 17-20 are combined;

FIG. 22 is a time domain illustration of the signal of FIG. 15 (chirp echoes) in the presence of the composite interference of FIG. 21;

FIG. 23 is a time domain illustration of the signal of FIG. 16 (PCW echoes) in the presence of the composite interference of FIG. 21;

FIG. 24 illustrates the range estimates after 64 independent test overlays for the three point target of FIG. 14, using the chirp signal of FIG. 12 in the presence of the interference of FIG. 21;

FIG. 25 illustrates the range estimates of FIG. 24, as a mean in solid and standard deviation in dotted lines;

FIG. 26 illustrates the range estimates after 64 independent test overlays for the three point target of FIG. 14 utilizing the PCW signal of FIG. 7 in the presence of the interference of FIG. 21;

FIG. 27 illustrates the range estimates of FIG. 26, as a mean in solid and standard deviation in dotted lines; and FIG. 28 is a graph illustrating the probability of detection versus the probability of false alarm for recovery of the three point targets of FIG. 14 using the standard chirp signal of FIG. 12 versus using the PCW signal of FIG. 7, in the presence of the interference of FIG. 21.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide an apparatus and a process for improved interference suppression and signal-to-noise ratio enhancement in echolocation and imaging systems.

The present invention is based on the design of novel waveforms and the use of novel processing methods for those waveforms in echo-location and imaging systems, such as for range estimation in radar, sonar, SAR, SAS, and laser radar, in order to obtain greater suppression of interference. These waveforms may be utilized for the suppression of interference, which includes jamming signals or noise, in any telemetric system, as well as in communication systems where the signals can be utilized as coding for a transmitted message f(m).

Interference can be viewed as an unknown additive component $\epsilon(n)$ and its echoes. The presence of interference at the receiver of every system is beyond our control. Its effect contaminates the received data. It may also incorporate ambient noise and measurement errors. The received signal model r(n) would be:

$$r(n) = \sum_m f(m)s(n-m) + \epsilon(n)$$

where f(m) is the reflectivity sequence of interest (i.e., target ranges) and n denotes the discrete time index.

The present invention concerns the design of s(n) and the processing of the collected data {r(n), s(n)} so that the resulting estimates of target ranges $\hat{f}(m)$ are as accurate as possible for a given interference $\epsilon(n)$.

The design of the waveform s(n) involves the pseudorandom convolution of a fixed elemental waveform (such as those commonly used in current systems, i.e., chirp signal) or the skewing of the amplitude histogram via a nonlinear transformation. The high skewness of the transmitted signal can be generated by a simple non-odd static nonlinear transformation of a fixed elemental waveform, such as a chirp signal.

Pseudorandom convolution allows interference suppression through conventional matched filtering techniques (also known as replica correlation or pulse compression). Skewing the amplitude of the transmitted signal provides a higher signal-to-noise ratio in the bispectral domain from which the signal of interest is reconstructed. Each of these shaping techniques may be adapted to any frequency band.

Referring now to FIG. 1, a system 11 is shown for performing pseudorandom convolution of an elemental waveform w(k) where (k=0,1,2, . . . , K) received on input 13 with a pseudorandom sequence p(n) wherein (n=1, . . . N) received on line 17 to generate a "coded" waveform s(n), on line 15. The elemental waveform w(k) can be chosen from the classes of currently-used waveforms such as sinusoidal pulse, linear FM pulse (chirp), hyperbolic FM pulse, impulse, etc. (a chirp is illustrated in FIG. 9, for example). The pseudorandom sequence p(n) is generally a multi-level signal, for example, binary, ternary, or any number of levels designed to have impulsive autocorrelation. The preferred embodiment of a coded waveform s(n) illustrated in FIG. 7 utilizes the binary pseudorandom sequence of FIG. 11. The resulting pseudorandomly convoluted waveform, the transmitted signal s(n) can be expressed as:

$$s(n) = \sum_{k=0}^{K} w(k)p(n-k)$$

where n=1, . . . , (N+K).

Figure 2:
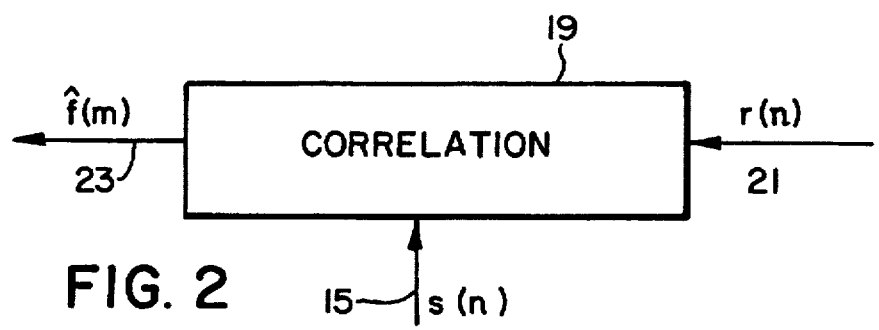
FIG. 2 is a block diagram of the processing system for a PCW received signal r(n)

When the pseudorandomly convoluted waveform s(n) is utilized in ranging systems, the echo signals r(n), received on line 21, as shown in FIG. 2, are correlated with a waveform replica of the transmitted signal s(n) supplied on line 15 to correlator 19 to produce the estimated ranges $\hat{f}(m)$ on line 23.

To obtain a highly skewed waveform, the elemental waveform w(k) on line 13 of FIG. 3 is subjected to a non-odd static nonlinear transformation N(w) by nonlinear transformer 25 to produce an amplitude skewed waveform $w_s(k)$ on output line 29.

The recovery of these amplitude skewed signals $w_s(k)$ requires the system shown in FIG. 5. The received echo signals $r_s(n)$ are fed on line 31 to a bispectrum processor 33 and a spectrum processor 35. The bispectrum processor 33 generates the bispectrum $B_r(\omega_1, \omega_2)$ on line 41 of the received echo signal $r_s(n)$. The spectrum processor 35 generates the spectrum $S_r(\omega)$ on line 45 of the received echo signal. A replica of the amplitude skewed waveform $w_s(k)$ is also fed over line 29 to the bispectrum processor 33 and the spectrum processor 35. The bispectrum processor generates the bispectrum $B_w(\omega_1, \omega_2)$ on line 43 of the skewed waveform $w_s(k)$. The spectrum processor 35 generates the spectrum $S_w(\omega)$ on line 47 of the skewed waveform $w_s(k)$.

The bispectrum $B_r(\omega_1, \omega_2)$ is divided by the bispectrum $B_w(\omega_1, \omega_2)$ by divider 37 to generate the bispectrum ratio $R(\omega_1, \omega_2)$ on line 49. This bispectrum ratio is fed to a bispectrum-bicoherence signal reconstruction processor 39 described in FIG. 6. Processor 39 also receives, on lines 45 and 47, the spectrum $S_r(\omega)$ and the spectrum $S_w(\omega)$ from spectrum processor 35. The bispectrum-bicoherence signal reconstruction processor 39 uses this received data to generate the range estimates $\hat{f}(m)$ on line 23.

The bispectrum estimation processor 33 may be implemented in one of two ways:

(1) Direct method: uses M-point FFT of the N-point record x(n) to obtain the complex transform $X(\omega)$ and then estimates the bispectrum of x(n) as:

$$B_x(\omega_1, \omega_2) = \overline{X(j\omega_1)X(j\omega_2)X^*(j\omega_1 + j\omega_2)}$$

for $0<\omega_1, \omega_2, (\omega_1+\omega_2)<\omega_{max}$, where the asterisk denotes conjugation and the overbar denotes ensemble averaging over possible multiple samples. Note that M sets the frequency resolution according to the requirements of each application. If M<N, then multiple segments of the N-point record may be used to produce multiple samples that can be averaged provided that the data form a periodic or stationary process. If M>N, then zero-packing is applied to the N-point record. Ensemble averaging may also be used if multiple N-point records are available, i.e., successive measurements of received echoes of repetitive transmissions.

(2) Indirect method: uses the triple correlation of x(n):

$$c_3(m_1, m_2) = \frac{1}{N - \max(m_1, m_2)} \sum_n x(n)x(n-m_1)x(n-m_2)$$

for $$-\frac{M}{2} + 1 \leq m_1, m_2 \leq \frac{M}{2},$$

and then estimates the bispectrum of x(n) by taking the 2D-FFT of $c_2(m_1, m_2)$.

$$B_x(\omega_1, \omega_2) = 2D - FFT\{c_3(m_1, m_2)\} =$$

$$\frac{1}{M^2} \sum_{m_1} \sum_{m_2} c_3(m_1, m_2) e^{-(jm_1\omega_1 - jm_2\omega_2)}$$

Ensemble averaging of individual bispectral estimates from separate data records is possible (and usually applied at the triple correlation stage) when such multiple sample records are available.

The spectrum estimation processor 35 also may be implemented in a direct or indirect method. The estimation of the spectrum $S_x(\omega)$ of x(n) may be estimated by:
(1) Direct method:

$$S_x(\omega) = \overline{X(j\omega)X^*(j\omega)}$$

(2) Indirect method:

$$S_x(\omega) = FFT\{c_2(m)\}$$

where $$c_2(m) = \frac{1}{N - |m|} \sum_n x(n)x(n - m).$$

The bispectrum-bicoherence signal reconstruction processor 39 is preferably implemented in the manner illustrated in FIG. 6. A divider 51 takes the spectrum $S_x(\omega)$ on line 45 and $S_w(\omega)$ on line 47 to form the ratio $S(\omega)$ on line 61, which is fed to a bicoherence processor 33. The bicoherence processor 53 also receives the bispectrum ratio $R(\omega_1, \omega_2)$ on line 49 and uses these inputs to generate a bicoherence factor $Q(\omega_1, \omega_2)$ on line 63 according to the following relationship:

$$Q(\omega_1, \omega_2) = |R(\omega_1, \omega_2)|^2 / S(\omega_1)S(\omega_2)S(\omega_1+\omega_2)]$$

a real function over the bifrequency domain $(\omega_1, \omega_2)$ of interest.

In FIG. 6, a bicoherence processor 53 receives as input the bispectral ratio $R(\omega_1, \omega_2)$ and the spectra ratio $S(\omega)$, which were computed by the dividers 37 and 51, respectively, and correspond to estimates of the bispectrum and spectrum of the reflectivity sequence f(m), respectively.

If the received data is noise-free, then the resulting bicoherence will be unity. However, noise contamination of the received data will result in deviation of the bicoherence from unity. These deviations can be viewed as a measure of the reliability of the bispectral measurements.

The bicoherence factor $Q(\omega_1, \omega_2)$ is supplied over line 63 to a weighting friction generator 57 that generates the weighting function $A(\omega_1, \omega_2)$ on line 65.

The weighting function $A(\omega_1, \omega_2)$ is based on the bicoherence $Q(\omega_1, \omega_2)$ so that $A(\cdot)$ is maximum when $Q(\cdot)=1$ and declines as Q deviates from 1. For instance: we may choose $$A(\omega_1, \omega_2) = c \cdot exp[-\alpha|Q(\omega_1, \omega_2)-1|^\beta]$$

where the parameters $\alpha$ and $\beta$ can be selected in each application and c is such that $$\sum_{\omega_1} \sum_{\omega_2} A(\omega_1, \omega_2) = 1.$$

Note that the definition of the weighting function may also take different forms depending on the application (e.g., asymmetric about Q=1), but it must always be maximum when Q=1 and decline as |Q−1| increases (may even become zero for large deviations of Q from 1). A particularly efficient implementation sets $A(\omega_1, \omega_2)=1$ for each $\omega_1+\omega_2$ only at a single point $(\omega_1, \omega-\omega_1)$ that has bicoherence value closest to unity and sets all other values of $A(\omega_1, \omega_2)=0$ for this specific $\omega=\omega_1+\omega_2$.

The weighting function $A(\omega_1, \omega_2)$ is fed on line 65 to a complex autocorrelation processor 55. This processor reconstructs the FFT of the reflectivity sequence using the weighting factor $A(\omega_1, \omega_2)$, the bispectrum ratio $R(\omega_1, \omega_2)$, and the conjugate of the $F(\omega)$ for all discrete frequencies less than $\omega$, generated by conjugation operator 59. The complex autorecursive processor operates as follows:

As indicated above, the bispectral ratio $$R(\omega_1, \omega_2) = \frac{B_f(\omega_1, \omega_2)}{B_w(\omega_1, \omega_2)}$$

is an estimate of the bispectrum of $F(\omega)$, that is:

$$R(\omega_1, \omega_2) = F(\omega_1)F(\omega_2)F^*(\omega_1+\omega_2)$$

which leads directly to the complex autorecursive relation:

$$\hat{F}(\omega) = \frac{R * (u, \omega - u)}{\hat{F} * (u)\hat{F} * (\omega - u)}$$

where $\omega=(\omega_1+\omega_2)$ and $u=\omega_1$ for all discrete values of u from 1 to $(\omega-1)$. Thus $\hat{F}(\omega)$ can be estimated sequentially (i.e., for increasing $\omega$) from its previous estimate and corresponding value of $R^*(\cdot)$. Since this can be done for many values of u, the various possible estimates can be averaged. To this purpose, a weighting function $A(u, \omega-u)$, based on the computed bicoherence, can be used to take into account the different reliability of the various bispectral measurements. Thus, in general:

$$\hat{F}(\omega) = \sum_{u=1}^{\omega-1} A(u, \omega-u) \frac{R * (u, \omega - u)}{\hat{F} * (u)\hat{F} * (\omega - u)}$$

where the weighting function, $A(u, \omega-u)$, attains maximum value when Q=1 and declines monotonically as Q deviates from 1. Many different forms of $A(\cdot)$ satisfing these basic requirements can be used; one class is defined above. The simplest reconstruction algorithm selects only one value of u for each $\omega$ for which $|1-Q(u, \omega-u)|$ is minimum.

The bispectrum $\hat{F}(\omega)$ on line 67 is fed to an Inverse Fast Fourier Transform processor 68 which generates the estimated range signals $\hat{f}(m)$ on line 23.

To obtain additional benefit, the convolution operation of FIG. 1 and the nonlinear transformation of FIG. 3 may be combined as shown in FIG. 4. This combined operation produces a highly skewed pseudorandomly convoluted waveform s, on output line 27. Recovery of the range estimates $\hat{f}(m)$ is accomplished by the processor of FIG. 5 as already described, where $s_r$ replaces $w_r$ and $r_s$ represents the return echo of $s_r$ at the input of the processor.

As an illustration of the operation of the system described in FIGS. 1–6, let us compare the operation of a standard ranging system with a ranging system that utilizes PCW signals, coded by pseudorandom convolution. FIG. 7 illustrates a signal 71 which is a pseudorandom convoluted elemental chirp waveform in the time domain. FIG. 8 illustrates the same signal 73 in the frequency domain. The signal 71 is obtained by taking the elemental chirp waveform 75 of FIG. 9, also shown in the frequency domain as waveform 77 (FIG. 10), and convolving it with the binary pseudorandom sequence 79 of FIG. 11.

The performance of the pseudorandom convoluted shaped signal 71 will be compared to a standard chirp signal 81 (FIG. 12) which has the same length and bandwidth as the shaped signal 71. The chirp signal 81 is shown in the frequency domain as signal 83 (FIG. 13). Both the chirp signal 81 and the shaped signal 71 will be tested against three point targets 85, 87, and 89 (FIG. 14) with the ranges indicated.

The echo signal 91 (FIG. 15) received from the three point targets of FIG. 14, when sending out the chirp signal 81 (FIG. 12), is illustrated in the time domain in FIG. 15. FIG. 16 shows the echo signal 93 received from the three point targets of FIG. 14 when the PCW signal 71 (FIG. 7) is sent out.

To compare the performance of the PCW signal 71 with the performance of the chirp signal 81 in the presence of interference, an interference signal ϵ(t) was constructed using the sum of three sine waves 95 shown in the frequency domain in FIG. 17 and three separate chirp signals 97, 99, and 101 shown in the frequency domain in FIGS. 18, 19, and 20, respectively. Each signal has arbitrary phases and onset/ offset values. The interference signals of FIGS. 17–20 are combined by summation into one composite. The spectrum of the composite of all these interference components is illustrated in the frequency domain as signal 103 (FIG. 21).

When the composite interference signal 103 is added to the received chirp echoes 91 (FIG. 15) and the received PCW echoes 93 (FIG. 16) for a signal-to-noise ratio (SNR) of −15 dB, the signals change dramatically as shown in FIGS. 22 and 23, respectively. FIG. 22 shows a signal 105 which is the result of adding the chirp echo signal 91 to the interference signal 103 for SNR=−15 dB. FIG. 23 illustrates a signal 107 which is the result of adding the PCW echo signal 93 to the interference signal 103 for SNR=−15 dB.

These echo plus interference signals 105 and 107 must be processed to recover the range data.

Consider first the received signal 105 which is the echo of the chirp signal of FIG. 12 on the three point target of FIG. 14 in the presence of the interference 103. FIG. 24 illustrates 64 independent tests overlaid, each at a signal-to-noise ratio of −15 dB, using standard pulse compression producing signals 109. FIG. 25 illustrates the average waveform 111 of the 64 independent tests in solid and the standard deviation waveform 113 in dotted lines, at each range.

Consider now the received signal 107 which is the echo of the PCW signal of FIG. 7 on the three point target of FIG. 14 in the presence of interference 103. FIG. 26 illustrates 64 independent tests overlaid, each at a signal-to-noise ratio of −15 dB, using standard pulse compression producing signals 115. FIG. 27 illustrates the average waveform 116 in solid and standard deviation waveform 119 in dotted lines, at each range.

Comparing the results depicted on the FIGS. 25 and 27, it is evident that the PCW signal has superior performance in terms of interference suppression. Further comparing the performance of the standard chirp signal 81 with the pseudorandom convoluted chirp 71 on the basis of "receiver operating curves" depicting the probability of detection versus probability of false alarm in FIG. 28 for SNR=−15 dB, the superior performance of the pseudorandom convoluted waveform 71 (PCW) is shown by trace 123 in juxtaposition to trace 121 of the standard chirp 81. It should be remembered that both the chirp signal 81 and the pseudorandom convoluted chirp signal 71 have the same bandwidth and length, and operate at the same interference with SNR= −15 dB.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. In an echo location or imaging system, generating target range estimates an apparatus providing improved interference suppression, comprising:

means for generating an elemental waveform w(k);

means for generating a pseudorandom sequence p(n);

a convolution processor receiving the elemental waveform w(k) and pseudorandom sequence p(n) for generating a pseudorandomly convoluted waveform s(n);

means for transmitting the convoluted waveform s(n) through a medium containing interference ϵ(n); and means for recovering the target range estimates f̂(m).

2. The apparatus of claim 1 wherein the elemental waveform may be any of the following: sinusoidal pulse, linear FM pulse (chirp), hyperbolic FM pulse, or impulse.

3. The apparatus of claim 1 wherein the pseudorandom sequence p(n) has impulsive autocorrelation characteristics.

4. The apparatus of claim 1 wherein said pseudorandom sequence p(n) is multi-level.

5. The apparatus of claim 1 wherein said pseudorandom sequence p(n) is binary.

6. The apparatus of claim 1 wherein said convolution processor generates the convoluted waveform according to the relationship:

$$s(n) = \sum_{k=0}^{K} w(k)p(n-k)$$

where:

w(o) is the elemental waveform, with k=0, 1, 2, . . . K, and p(n) is the pseudorandom sequence, with n=1, . . . (N+K).

7. In an echo location or imaging system, generating target range estimates an apparatus providing an improved signal-to-noise ratio, comprising:

means for generating an elemental waveform w(k);

means for receiving the elemental waveform w(k) and producing a highly skewed waveform $w_s(k)$ by nonlinear transformation;

means for transmitting the skewed waveform $w_s(k)$ through a medium containing interference ϵ(n); and means for recovering the target range estimates f̂(m).

8. The apparatus of claim 7 wherein the elemental waveform may be any of the following: sinusoidal pulse, linear FM pulse (chirp), hyperbolic FM pulse, or impulse.

9. The apparatus of claim 7 wherein said nonlinear transformation means comprises non-odd static nonlinear transformation.

10. In an echo location or imaging system, generating target range estimates an apparatus providing improved interference suppression and an improved signal-to-noise ratio, comprising:

means for generating an elemental waveform w(k);

means for generating a pseudorandom sequence p(n);

a convolution processor for receiving the elemental waveform w(k) and pseudorandom sequence p(n) and generating a pseudorandomly convoluted waveform s(n);

means for receiving the convoluted waveform s(n) and generating a skewed convoluted waveform $s_s(n)$ by nonlinear transformation;

means for transmitting the skewed convoluted waveform $s_s(n)$ through a medium containing interference $\epsilon(n)$; and means for recovering the target range estimates $\hat{f}(m)$.

11. The apparatus of claim 10 wherein the elemental waveform may be any of the following: sinusoidal pulse, linear FM pulse (chirp), hyperbolic FM pulse, or impulse.

12. The apparatus of claim 10 wherein the pseudorandom sequence p(n) has impulsive autocorrelation characteristics.

13. The apparatus of claim 10 wherein said pseudorandom sequence p(n) is multilevel.

14. The apparatus of claim 10 w herein said pseudorandom sequence p(n) is binary.

15. The apparatus of claim 10 wherein said convolution processor generates convoluted waveforms according to the relationship:

$$s(n) = \sum_{k=0}^{K} w(k)p(n-k)$$

where:

w(k) is the elemental waveform, with k=0, 1, 2, ... K, and p(n) is the pseudorandom sequence, with n=1, ... (N+K).

16. The apparatus of claim 10 wherein said nonlinear transformation means comprises non-odd static nonlinear transformation.

17. The apparatus of claim 10 wherein said means for recovering the transmitted waveform $s_s(s)$ comprises:

means for receiving the elemental waveform, w(k) and generating a skewed waveform $w_s(k)$;

a bispectrum processor receiving a signal transmitted through an interference medium and the skewed waveform $w_s(k)$, said processor generating the bispectrum for the received signal and the skewed waveform;

a spectrum processor simultaneously receiving the signal transmitted through an interference medium and the skewed waveform $w_s(k)$ said spectrum processor generating the spectrum for the received signal and the skewed waveform;

means for forming a ratio between the bispectrum for the received signal and the bispectrum for the skewed waveform; and a bispectral bicoherence signal reconstruction processor receiving the bispectrum ratio from said ratio forming means, the spectrum of the received signal and the spectrum of the skewed waveform from said spectrum processor, said processor recovering the estimate of target ranges.

18. The apparatus of claim 17 wherein said bispectral bicoherence signal reconstruction processor comprises:

means for forming a ratio between the spectrum of the received signal and the spectrum of the skewed waveform;

a bicoherence processor receiving the spectrum ratio from the spectrum ratio forming means, and receiving the bispectrum ratio from the bispectrum ratio forming means, said bicoherence processor generating a bicoherence signal;

means for receiving the bicoherence signal and generating a weighting factor; and a reconstruction processor receiving the weighting factor from said weighting factor generating means and the bispectrum ratio from said ratio forming means for generating the target range estimates $\hat{f}(m)$.

19. In an echo-location system wherein a transmitted signal s(n) encounters interference $\epsilon(n)$, is reflected by a target, and received as a signal r(n), an apparatus for improving the range estimates to the target for any given interference $\epsilon(n)$, said apparatus comprising:

means for generating an elemental waveform w(k);

means for generating a pseudorandom sequence p(n);

a convolution processor receiving the elemental waveform w(k) and pseudorandom sequence p(n) for generating a pseudorandomly convoluted waveform s(n);

means for transmitting the convoluted waveform s(n) to a target that reflects the waveform; and means for receiving the reflected convoluted waveform r(n) which contains an interference component $\epsilon(n)$ and correlating the reflected signal r(n) with the convoluted waveform s(n) to generate a target range estimate $\hat{f}(m)$.

20. The apparatus of claim 19 wherein the elemental waveform may be any of the following: sinusoidal pulse, linear FM pulse (chirp), hyperbolic FM pulse, or impulse.

21. The apparatus of claim 19 wherein the pseudorandom sequence p(n) has impulsive autocorrelation characteristics.

22. The apparatus of claim 19 wherein said pseudorandom sequence p(n) is multi-level.

23. The apparatus of claim 19 wherein said pseudorandom sequence p(n) is binary.

24. The apparatus of claim 19 wherein said convolution processor generates the convoluted waveforms according to the relationship:

$$s(n) = \sum_{k=0}^{K} w(k)p(n-k)$$

where:

w(k) is the elemental waveform, with k=0, 1, 2, ... K, and p(n) is the pseudorandom sequence, with n=1, ... (N+K).

25. In an echo-location system wherein a transmitted signal encounters interference $\epsilon(n)$, is reflected by a target, and received as a signal r(n), an apparatus for improving the range estimates to the target for any given interference $\epsilon(n)$, said apparatus comprising:

means for generating an elemental waveform w(k);

means for receiving the elemental waveform w(k) and producing a highly skewed waveform $w_s(k)$ by nonlinear transformation;

means for transmitting the skewed waveform $w_s(k)$ to a target that reflects the waveform $w_s(k)$; and means for receiving the reflected waveform $w_s(k)$ which contains an interference component $\epsilon(n)$ and generating a target range estimate $\hat{f}(m)$.

26. The apparatus of claim 25 wherein the elemental waveform may be any of the following: sinusoidal pulse, linear FM pulse (chirp), hyperbolic FM pulse, or impulse.

27. The apparatus of claim 25 wherein said nonlinear transformation means comprises non-odd static nonlinear transformation.

28. In an echo-location system wherein a transmitted signal encounters interference $\epsilon(n)$, is reflected by a target, and received as a signal r(n), an apparatus for improving the range estimates to the target for any given interference ε(n), said apparatus comprising:

means for generating an elemental waveform w(k);

means for generating a pseudorandom sequence p(n);

a convolution processor for receiving the elemental waveform w(k) and pseudorandom sequence p(n) and generating a pseudorandom convoluted waveform s(n);

means for generating an amplitude skewed convoluted waveform $s_s(n)$ by nonlinear transformation;

means for transmitting the skewed convoluted waveform $s_s(n)$ to a target that reflects the waveform; and means for receiving the reflected skewed convoluted waveform $r_s(n)$ which contains an interference component ε(n) and generating a target range estimate $\hat{f}(m)$.

29. The apparatus of claim 28 wherein the elemental waveform may be any of the following: sinusoidal pulse, linear FM pulse (chirp), hyperbolic FM pulse, or impulse.

30. The apparatus of claim 28 wherein the pseudorandom sequence p(n) has impulsive autocorrelation characteristics.

31. The apparatus of claim 28 wherein said pseudorandom sequence p(n) is multi-level.

32. The apparatus of claim 28 wherein said pseudorandom p(n) sequence p(n) is binary.

33. The apparatus of claim 28 wherein said convolution processor generates the convoluted waveforms according to the relationship:

$$s(n) = \sum_{k=0}^{K} w(k)p(n-k)$$

where:

w(k) is the elemental waveform, with k=0, 1, 2, ... K, and p(n) is the pseudorandom sequence, with n=1, ... (N+K).

34. The apparatus of claim 28 wherein said nonlinear transformation means comprises non-odd static nonlinear transformation.

35. The apparatus of claim 28 wherein said means for receiving the reflected waveform $r_s(n)$ and generating a target range estimate $\hat{f}(m)$ comprises:

means for receiving the elemental waveform w(k) and generating an amplitude skewed waveform $w_s(k)$;

a bispectrum processor for receiving the reflected waveform $r_s(n)$ and the skewed waveform $w_s(k)$ and generating the bispectrum $B_r(\omega_1, \omega_2)$ for $r_s(n)$ and the bispectrum $B_w(\omega_1, \omega_2)$ for $w_s(k)$;

a spectrum processor for receiving the reflected waveform $r_s(n)$ and the skewed waveform $w_s(k)$ and generating the spectrum $S_r(\omega)$ for $r_s(n)$ and the spectrum $S_w(\omega)$ for $w_s(k)$;

means for generating the bispectral ratio $R_1(\omega_1, \omega_2)$ by taking $B_r(\omega_1, \omega_2)$ over $B_w(\omega_1, \omega_2)$; and a bispectral bicoherence signal reconstruction processor receiving the bispectral ratio $R_1(\omega_1, \omega_2)$, the spectrum $S_r(\omega)$, and the spectrum $S_w(o)$ and generating the target range estimate $\hat{f}(m)$.

36. The apparatus of claim 35 wherein said bispectral bicoherence signal reconstruction processor comprises:

means for generating the spectral ratio S(ω) by taking $S_r(\omega)$ over $S_w(\omega)$;

a bicoherence processor for receiving the spectral ratio S(ω) and the bispectral ratio R(ω₁, ω₂) and generating a bicoherence Q(ω₁, ω₂);

means for generating a weighting factor A(ω₁, ω₂) in response to said bicoherence Q(ω₁, ω₂); and a complex auto-recursive reconstruction processor receiving the bispectral ratio R(ω₁, ω₂) and the weighting factor A(ω₁, ω₂) and generating an estimate of the FFT of the target range F(ω).

37. The apparatus of claim 36 further comprising:

means for generating the conjugate of F(ω) and supplying it to said reconstruction processor; and an Inverse Fast Fourier Transform generating means for receiving the F(ω) and generating the target range.

38. In a telemetric system exhibiting interference ε(n), a process for providing interference suppression, the steps of the process comprising:

generating a pseudorandom convoluted waveform s(n) by convoluting an elemental waveform w(k) with a pseudorandom sequence p(n);

transmitting the convoluted waveform s(n) through a medium having interference ε(n); and recovering the waveform s(n) at a receiving end.

39. The process of claim 38 wherein the elemental waveform may be any of the following: sinusoidal pulse, linear FM pulse (chirp), hyperbolic FM pulse, or impulse.

40. The process of claim 39 wherein said pseudorandom sequence p(n) is multi-level.

41. The process of claim 40 wherein said multi-level pseudorandom sequence is binary.

42. In a telemetric system exhibiting interference ε(n), a process for providing improved signal-to-noise ratio, the steps of the process comprising:

generating a highly skewed waveform $w_s(k)$ by nonlinear transformation of an elemental waveform w(k);

transmitting the skewed waveform $w_s(k)$ through a medium having interference ε(n); and recovering the waveform w(k) at a receiving end.

43. The process of claim 42 wherein the elemental waveform may be any of the following: sinusoidal pulse, linear FM pulse (chirp), hyperbolic FM pulse, or impulse.

44. The process of claim 42 wherein said generating step further comprises non-odd static nonlinear transformation.

45. In a telemetric system exhibiting interference ε(n), a process for providing interference suppression and an improved signal-to-noise ratio, the steps of the process comprising:

generating a pseudorandom convoluted waveform s(n) by convoluting an elemental waveform w(k) with a pseudorandom sequence p(n);

generating a skewed convoluted waveform $s_s$ (n) by nonlinear transformation of the convoluted waveform s(n);

transmitting the skewed convoluted waveform $s_s(n)$ through a medium having interference ε(n); and recovering the transmitted waveform $s_s(n)$ at a receiving end.

46. The process of claim 45 wherein the elemental waveform may be any of the following: sinusoidal pulse, linear FM pulse (chirp), hyperbolic FM pulse, or impulse.

47. The process of claim 45 wherein said skewed convoluted waveform generating step further comprises non-odd static nonlinear transformation.

48. The process of claim 45 wherein said pseudorandom sequence p(n) is multi-level.

49. The process of claim 45 wherein said pseudorandom sequence p(n) is binary.

50. In an echo-location system wherein a transmitted signal encounters interference ε(n), is reflected by a target, and received as a signal r(n), a process for providing improved range estimates f̂(m) to the target for any given interference ϵ(n), said apparatus comprising:

generating a pseudorandom convoluted waveform s(n) by convoluting an elemental waveform w(k) with a pseudorandom sequence p(n);

generating an amplitude skewed convoluted waveform $s_s(n)$ by nonlinear transformation of s(n);

transmitting the skewed convoluted waveform $s_s(n)$ to a target that reflects the waveform; and generating target range estimates f̂(m) from the reflected received waveform $r_s(n)$.

51. The apparatus of claim 50 wherein the elemental waveform may be any of the following: sinusoidal pulse, linear FM pulse (chirp), hyperbolic FM pulse, or impulse.

52. The apparatus of claim 50 wherein the pseudorandom sequence p(n) has impulsive autocorrelation characteristics.

53. The apparatus of claim 50 wherein said pseudorandom sequence p(n) is multi-level.

54. The apparatus of claim 50 wherein said pseudorandom sequence p(n) is binary.

55. The apparatus of claim 50 wherein the amplitude skewed convoluted waveform generating step further comprises non-odd static nonlinear transformation.

56. The apparatus of claim 50 wherein said generating target range estimate f̂(m) step comprises the steps of:

generating an amplitude skewed waveform $w_s(k)$ by nonlinear transformation of w(k);

generating a bispectrum $B_r(\omega_1, \omega_2)$ from the received signal $r_s(n)$;

generating a bispectrum $B_w(\omega_1, \omega_2)$ from the waveform $w_s(k)$;

generating a spectrum $S_r(\omega)$ from the received waveform $r_s(n)$;

generating a spectrum $S_w(\omega)$ from the waveform $w_s(k)$;

generating a bispectral ratio $R_1(\omega_1, \omega_2)$ from bispectrum $B_r(\omega_1, \omega_2)$ and $B_w(\omega_1, \omega_2)$; and generating a target range estimate f̂(m) from the bispectral ratio $R_1(\omega_1, \omega_2)$, the spectrum $S_r(O)$, and the spectrum $S_w(\omega)$.

57. The process of claim 56 wherein said target range estimate generating step comprises the steps of:

generating a spectral ratio S(ω) from the spectrum $S_r(\omega)$ and the spectrum $S_w(\omega)$;

generating a bicoherence signal $Q(\omega_1, \omega_2)$ from the spectral ratio $S_w(\omega)$ and the bispectral ratio $R_1(\omega_1, \omega_2)$;

generating a weighting factor $A(\omega_1, \omega_2)$ from the bicoherence signal $Q(\omega_1, \omega_2)$; and generating the target range estimates f̂(m) from the bispectral ratio $R_1(\omega_1, \omega_2)$ and the weighting factor $A(\omega_1, \omega_2)$.

58. The process of claim 57 wherein said target range estimate f̂(m) generating step comprises the steps of:

generating a bispectrum F(ω);

generating the conjugate F(ω) of the bispectrum; and generating the target range estimates f̂(m) from the bispectrum F(ω) by an Inverse Fast Fourier Transform.

* * * * *